UNITED STATES PATENT OFFICE.

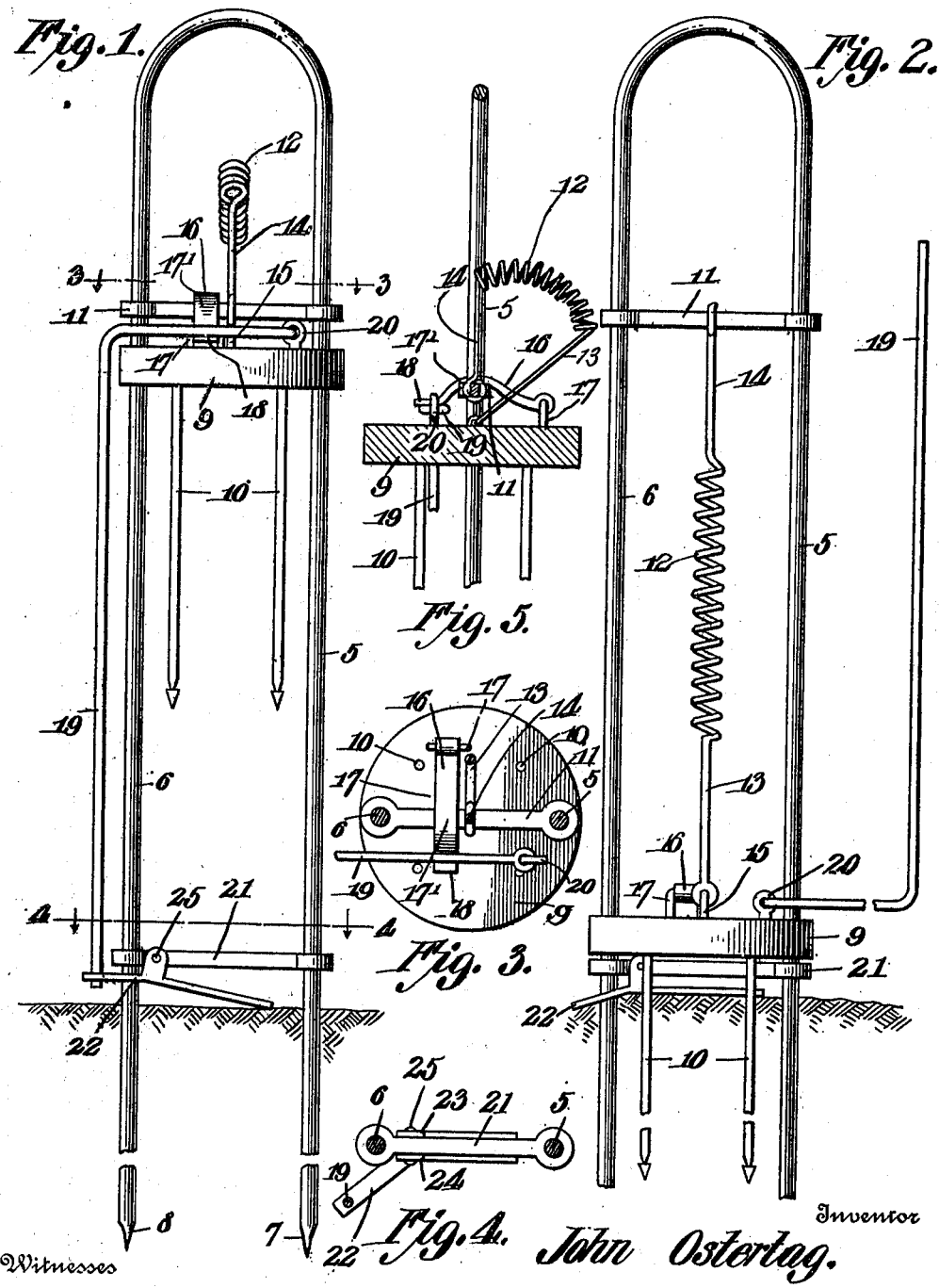

JOHN OSTERTAG, OF EUREKA, CALIFORNIA.

ANIMAL-TRAP.

993,192.  Specification of Letters Patent.  Patented May 23, 1911.

Application filed February 2, 1910. Serial No. 541,522.

*To all whom it may concern:*

Be it known that I, JOHN OSTERTAG, a citizen of the United States, residing at Eureka, in the county of Humboldt and State of California, have invented new and useful Improvements in Animal-Traps, of which the following is a specification.

This invention relates to improvements in animal traps and has particular reference to a device of that kind employed to trap animals which live in the ground.

One object of the invention is the provision of a trap which may be arranged directly above the hole or burrow through which the animal exits and enters the ground and so positioned that when the animal attempts to leave the opening in the ground the trap will be tripped and descend upon the animal.

With these and other objects in view, which will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size, and minor details of the device may be made, within the scope of the appended claim, without departing from the spirit or sacrificing any of the advantages of the invention.

In the accompanying drawings, forming a part of the specification:—Figure 1 is a side elevation of the device in set position. Fig. 2 is a similar view with the parts in released position. Fig. 3 is a sectional plan view on the line 3—3 of Fig. 1. Fig. 4 is a similar view on the line 4—4 of Fig. 1. Fig. 5 is a side elevation partly in section of the upper end portion of the trap looking in a direction at right angles to Fig. 1.

Similar numerals of reference are employed to designate corresponding parts throughout.

The trap includes in its construction what will subsequently be termed a supporting frame. This member is preferably formed of a single piece of stout steel wire bent into a substantial and inverted U-shape the opposite limbs of which are designated by the numerals 5 and 6. The extremities of these limbs are sharpened as shown at 7 and 8, whereby the supporting frame may be easily inserted into the ground.

What will subsequently be termed a plunger is designated by the numeral 9. This member is preferably formed of a disk of metal or the like and has diametrically opposite openings for the loose reception of the limbs 5 and 6 of the supporting frame, whereby the plunger is slidingly fitted on said frame. Depending from the lower face of the plunger 9 are a plurality of barbs or spears 10. These members are somewhat less in length than the supporting frame and when the plunger is raised to a point adjacent the upper end of the frame the lower ends of these spears will be considerably above the level of the ground. When the plunger descends however the sharpened points of these spears will penetrate the ground and move into the body of the animal.

In order to maintain the plunger in raised or set position the following construction is employed:—By reference now to Figs. 1 to 3 inclusive it will be seen that arranged adjacent the upper end of the frame is what will subsequently be termed a latch bar 11. This member is preferably formed of a single piece of metal and has its opposite ends provided with openings for the reception of the limbs 5 and 6 of the supporting frame to which it is fixedly secured in any preferred manner. Connection between the latch bar 11 and plunger 9 is established by means of a helical compression spring 12. The opposite ends of the spring 12 terminate in elongated arms 13 and 14 one of which is provided with an eye for the reception of the latch bar 11 while the end of the opposite arm is provided with a similar eye which receives an eye bolt 15 extending upwardly from the plunger 9. The spring will correspond in length approximately to the distance between the ground, when the supporting frame is inserted in the latter, and the latch bar 11. Thus it will be seen when the plunger 9 is moved upwardly and to a point adjacent the latch bar 11 the spring will be tensioned and when the force acting against the tension of the spring is moved the plunger will descend, whereby the spears will enter the opening in the ground.

In order to provide a construction for maintaining the plunger in raised or set position and for releasing the same to descend at the desired moment the following is employed:—By reference now to Figs. 1, 3 and 5 it will be seen that pivotally secured to the upper face of the plunger 9 is one end of a latch 16. The latch 16 at one end is provided with an opening for the reception of a staple 17 or the like by means of which it is secured to the plunger and is arranged for pivotal movement in a plane transverse the latch bar 11. The intermediate portion of the latch 16 is bowed as shown at 17' and its free end is perfectly straight as shown at 18 and when it is desired to set the trap this latch is moved transverse the latch bar as shown in Fig. 5 so that its free end will lie on that side of the latch bar opposite to the side adjacent to its secured end. A keeper is designated by the numeral 19 and is shown to consist of a single piece of stout steel wire or the like one terminal of which is provided with an eye which receives an eye bolt 20 secured to the upper face of the plunger 9 and on that side of the latch bar over which the free end of the latch lies when the parts are in set position. The keeper 19 extends for a portion of its length in a horizontal plane parallel with the plunger when the latter is in its raised position, and this portion of the keeper overlies the free end of the latch, whereby upward and outward movement of the said latch will be prevented. That portion of the keeper extending parallel with the plunger, when the latter is raised terminates at a point to one side of the plunger in a downward extension the terminal of which extends to a point adjacent to the lower end of the limb 6 of the supporting frame. What will subsequently be termed a trigger bar is designated by the numeral 21 and corresponds in shape to the latch bar 11. This trigger bar is fixedly secured to the limbs 6 at a point substantially intermediate their middle and free ends. A trigger is designated by the numeral 22 and is preferably formed of a single piece of sheet metal the intermediate portion of which is provided on its opposite sides with upstanding ears 23 and 24 which straddle the trigger bar and are pivoted thereto by means of a pin 25 passing through alining openings in the ears and trigger bar. That portion of the trigger lying between the ears 25 and the limbs 6 of the supporting frame is offset and extends to a point in advance of the limb 6 and adjacent its free end is provided with an opening which receives the lower end of the keeper 19. The opposite end portion of the trigger or that arranged between the limbs 5 and 6 is inclined downwardly and is designed to bear upon the ground when the parts are in set position as shown in Fig. 1.

Having now described the construction of the device its operation will be given. Assuming that the parts are in the position as shown in Fig. 2 and it is desired to set the trap the plunger 9 is first raised to a point to and adjacent the latch bar 11 after which the latch is moved transverse the latch bar until its free end bears on the upper face of the plunger. When the members are so positioned the upper end portion of the keeper is moved over the free end of the latch and the opening at the free end of the trigger brought into co-incidence with the free end of the keeper, after which the opposite end of the trigger is depressed until the lower end portion of the keeper is well within the opening of the trigger and the said inner end portion of the trigger bears upon the ground. When the parts are in this position it will be evident that when an animal attempts to exit through an opening in the ground over which the trap is placed he will move the inner end of the trigger upwardly, whereby the outer end will move from engagement with the keeper and by virtue of the spring 12 the plunger will move downwardly throwing the keeper upwardly and outwardly, and the spears embed themselves into the head of the animal.

Thus it can be seen that I have provided a device which is comparatively simple in structure and inexpensive in manufacture, embodying few parts and these so arranged that the danger of derangement will be reduced to a minimum.

I claim:—

In an animal trap, the combination with a supporting frame, a spring-pressed plunger slidingly fitted on said frame, a latch bar secured to the upper end portion of the frame, a latch pivoted to the plunger and movable transverse the latch bar, a keeper having one end pivoted to the plunger and having a portion to bear on the free end of the latch and maintain the plunger in raised position against the action of its spring, a trigger bar secured to the lower end portion of the frame and in alinement with the latch bar, and a trigger having its medial portion pivoted to the trigger bar and having an opening adjacent to one end to receive the keeper.

In testimony whereof I affix my signature in presence of two witnesses.

JOHN OSTERTAG.

Witnesses:
JOHN SCHOTT,
M. B. STEINHOFER.

Copies of this patent may be obtained for five cents each, by addressing the "Commissioner of Patents, Washington, D. C."